United States Patent
Jung et al.

(10) Patent No.: US 8,966,641 B2
(45) Date of Patent: Feb. 24, 2015

(54) METHOD AND APPARATUS FOR ENSURING SECURITY OF REMOTE USER INTERFACE SESSION USING OUT-OF-BAND COMMUNICATION

(75) Inventors: Dong-shin Jung, Suwon-si (KR); Joo-yeol Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1247 days.

(21) Appl. No.: 12/146,502

(22) Filed: Jun. 26, 2008

(65) Prior Publication Data

US 2009/0007225 A1 Jan. 1, 2009

Related U.S. Application Data

(60) Provisional application No. 60/947,124, filed on Jun. 29, 2007.

(51) Int. Cl.
| | | |
|---|---|---|
| *G06F 15/16* | (2006.01) | |
| *H04L 29/06* | (2006.01) | |
| *G06F 21/10* | (2013.01) | |
| *G06Q 30/06* | (2012.01) | |
| *G06F 17/30* | (2006.01) | |
| *G06F 7/04* | (2006.01) | |

(52) U.S. Cl.
CPC .............. *H04L 63/20* (2013.01); *G06F 21/10* (2013.01); *G06Q 30/06* (2013.01); *G06F 2221/2135* (2013.01)
USPC .................................................. 726/26; 726/2

(58) Field of Classification Search
USPC ....................................... 726/1, 2, 21, 26–30
See application file for complete search history.

(56) References Cited

U.S. PATENT DOCUMENTS

| | | | |
|---|---|---|---|
| 6,766,454 B1* | 7/2004 | Riggins | 713/185 |
| 2002/0162027 A1* | 10/2002 | Itwaru | 713/201 |
| 2003/0196113 A1* | 10/2003 | Brown et al. | 713/201 |
| 2003/0229900 A1* | 12/2003 | Reisman | 725/87 |
| 2004/0193609 A1* | 9/2004 | Phan et al. | 707/10 |
| 2005/0135388 A1* | 6/2005 | Hartikainen et al. | 370/401 |
| 2006/0020950 A1* | 1/2006 | Ladd et al. | 719/328 |
| 2007/0078987 A1* | 4/2007 | Walker et al. | 709/227 |
| 2007/0107019 A1* | 5/2007 | Romano et al. | 725/80 |
| 2008/0022084 A1* | 1/2008 | Raftelis et al. | 713/153 |
| 2009/0055642 A1* | 2/2009 | Myers et al. | 713/155 |
| 2009/0100147 A1* | 4/2009 | Igarashi | 709/218 |

OTHER PUBLICATIONS

Microsoft Computer Dictionary, Fifth Edition, Microsoft Press, 2002, 4 pages.*
Communication dated Apr. 7, 2014 from the Korean Intellectual Property Office in a counterpart Korean application No. 10-2008-0031712.

* cited by examiner

*Primary Examiner* — Michael Simitoski
(74) *Attorney, Agent, or Firm* — Sughrue Mion, PLLC

(57) ABSTRACT

A method and apparatus for ensuring security of a session. In the method, a first client selects a user interface related to a process in need of security from among user interfaces related to predetermined contents provided from a first server, and a first client or a second client communicates directly with a second server operated by a contents provider to perform the process in need of security and notifies the first server of the performing result. Thus, it is not required to transmit/receive security information via the first server.

26 Claims, 5 Drawing Sheets

METHOD AND APPARATUS FOR ENSURING SECURITY OF REMOTE USER INTERFACE SESSION USING OUT-OF-BAND COMMUNICATION

CROSS-REFERENCE TO RELATED PATENT APPLICATION

This application claims the benefit of U.S. Provisional Patent Application No. 60/947,124, filed on Jun. 29, 2007, in the U.S. Patent and Trademark Office, and priority from Korean Patent Application No. 10-2008-0031712, filed on Apr. 4, 2008, in the Korean Intellectual Property Office, the disclosures of which are incorporated herein in their entirety by reference.

BACKGROUND OF THE INVENTION

1. Field of the Invention

The present invention relates to a method and apparatus for ensuring security of a session, and more particularly, to a method and apparatus for ensuring security of a client in a session defined using a remote user interface (RUI).

2. Description of the Related Art

As wired/wireless network technologies have rapidly developed and services using wired/wireless network, such as online shopping, have increased, security information (e.g., credit card numbers, passwords, etc.) has been increasingly transferred. Since security information is transferred between two remote devices via a wired/wireless network, security may be compromised. It is always possible others may obtain security information and use it illegally (e.g., for hacking or wiretapping). In particular, when a communication link is formed between two remote devices via another third device, there is even more risk.

FIG. 1 illustrates a conventional session defined using a remote user interface (RUI).

Referring to FIG. 1, two devices of a home network, i.e., an RUI server 110 and an RUI client 120, define a predetermined session by using the RUI. The RUI client 120 accesses contents of a contents server 130 by using the RUI provided by the RUI server 110. The RUI server 110 receives data related to the contents from the contents server 130, and provides RUIs based on the data to the RUI client 120.

In the conventional session illustrated in FIG. 1, the RUI client 120 should access the contents of the contents server 130 via the RUI server 110. This denotes that the RUI client 120 should also transmit security information (e.g., a credit card number, a password, etc) via the RUI server 110 to the contents server 130. For example, when payment is required in order to use the contents of the contents server 130, all information that is input by the RUI client 120 for the payment is transmitted to the contents server 130 via the RUI server 110. Since the security information is transmitted to the contents server 130 via the RUI server 110, it is more likely that others can steal the security information of the RUI client 120 by hacking or wiretapping the RUI server 110.

Accordingly, there is a need for a method and apparatus for ensuring security by which the RUI client 120 can efficiently transmit security information to the contents server 130 without passing through the RUI server 110.

SUMMARY OF THE INVENTION

The present invention provides a method and apparatus for ensuring security, thereby removing security vulnerability, which occurs when security information of a client is passed through a server providing a user interface in a session defined using the user interface, and a computer readable recording medium having recorded thereon a program for executing the method.

According to an aspect of the present invention, there is provided a method of ensuring security of a session of a first server with respect to a first client, the method comprising: providing user interfaces related to predetermined contents to the first client; transmitting data related to a process in need of security to the first client or a second client while the first client selects a user interface related to the process from among the user interfaces; and receiving a result of performing the process from the first client or the second client by using the transmitted data, wherein the first client or the second client communicates directly with a second server providing the contents to perform the process.

According to another aspect of the present invention, there is provided a method of ensuring security of a session of a first client with respect to a first server, the method comprising: receiving user interfaces related to predetermined contents from the first server; selecting a user interface related to a process in need of security from among the user interfaces; and receiving a user interface related to a result performing of the process from the first server, according to the selection, wherein the first client or a second client communicates directly with a second server providing the predetermined contents to perform the process.

According to another aspect of the present invention, there is provided an apparatus for ensuring security of a session of a first server with respect to a first client, the apparatus comprising: an interface providing unit providing user interfaces related to predetermined contents to the first client; and a process controlling unit transmitting data related to a process to the first client or a second client as the first client selects a user interface related to the process in need of security from among the user interfaces, and receiving a result of performing the process by using the transmitted data from the first client or the second client, wherein the first client or the second client communicates directly with a second server to perform the process.

According to another aspect of the present invention, there is provided an apparatus for ensuring security of a session of a first client with respect to a first server, the apparatus comprising: an interface receiving unit which receives user interfaces related to predetermined contents from the first server and selects a user interface related to a process in need of security from among the user interfaces; a process controlling unit which receives data related to the process from the first server, according to the selection; and a processing performing unit which communicates directly with a second server providing the predetermined contents to perform the process, wherein the process controlling unit transmits the result of performing the process to the first server.

According to another aspect of the present invention, there is provided an apparatus of a second client for ensuring security of a session between a first server and a first client, the apparatus comprising: a process controlling unit which receives data related to a process in need of security while a first client receives user interfaces related to predetermined contents from the first server and selects a user interface related to the process from among the received user interfaces; and a processing performing unit which communicates directly with a second server providing the predetermined contents to perform the process, based on the received data, wherein the process controlling unit transmits the result of performing the process to the first server.

The first server may be a remote user interface server (RUIS), and the first client may be a remote user interface client (RUIC).

The first server, the first client and the second client may be devices of a home network.

The first server may be an Internet protocol television (IPTV) set top box, and the first client may be a TV.

The process may be a process related to payment for the predetermined contents.

According to another aspect of the present invention, there is provided a computer readable recording medium having recorded thereon a program for executing the above-described method.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE
EXEMPLARY EMBODIMENTS OF THE
INVENTION

Hereinafter, the present invention will be described in detail by explaining exemplary embodiments of the invention with reference to the attached drawings.

Figure 1:
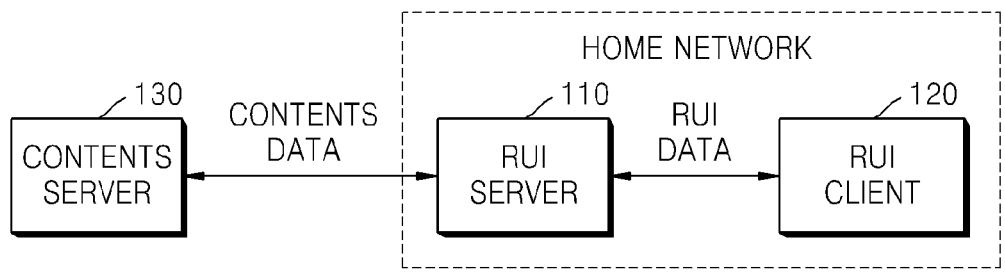
FIG. 1 illustrates a conventional session defined using a remote user interface (RUI)
Figure 2:
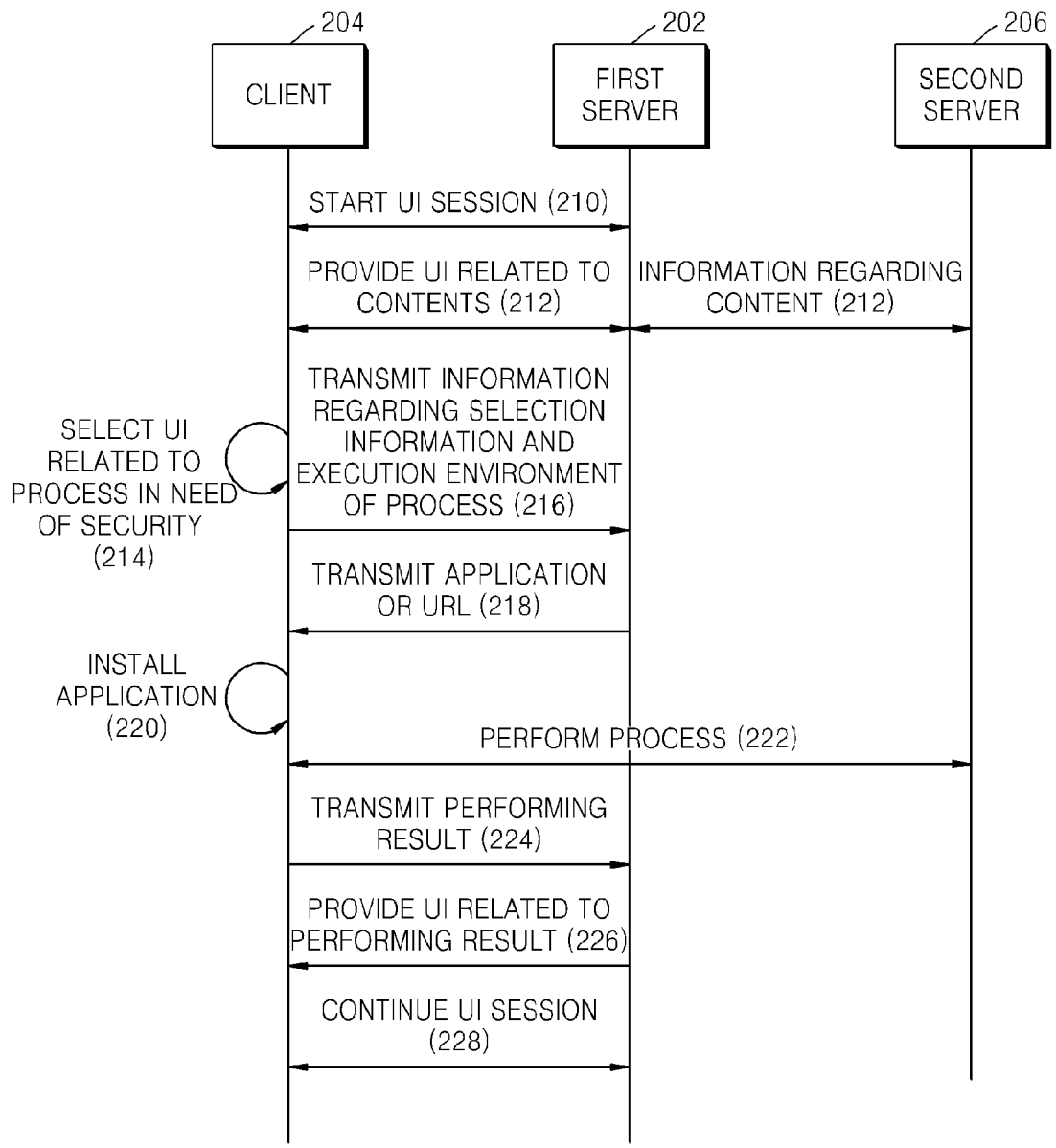
FIG. 2 is a flowchart of a method of ensuring security of a session, according to an exemplary embodiment of the present invention.

FIG. 2 is a flowchart of a method of ensuring security of a session, according to an exemplary embodiment of the present invention.

Referring to FIG. 2, a first server 202 is a device that defines a session by providing a user interface to a client 204. The client 204 is a device that receives the user interface from the first server 202 and uses contents of a second server 206 by using the user interface that is received from the first server 202. The second server 206 is a server operated by a contents provider and contains the contents provided to the client 204.

The first server 202 and the client 204 may be respectively a server and a client that exist in the same home network. The first server 202 may be a remote user interface server (RUIS) of the home network. Correspondingly, the client 204 may be a remote user interface client (RUIC) of the home network.

When the first server 202, the second server 206 and the client 204 are devices of an Internet protocol television (IPTV) network, the first server 202 may be an IPTV set top box relaying IPTV contents to the client 204, the client 204 may be a TV that displays the IPTV contents, and the second server 206 may be a contents server operated by an IPTV service provider.

In operation 210, the first server 202 and the client 204 start a predetermined remote user interface session. The first server 202 provides a predetermined user interface to the client 204, and the client 204 accesses the first server 202 by using the provided user interface.

In operation 212, the first server 202 receives information regarding predetermined contents from the second server 206, and provides user interfaces related to the contents to the client 204, based on the received information. In this regard, the first server 202 may directly generate user interfaces including information regarding the contents and may provide the generated user interfaces to the client 204, or alternatively, may provide only information regarding the contents to the client 204 and the client 204 directly generates the user interfaces.

The information regarding contents may include information regarding multimedia such as a movie, music or text, and may include information regarding online shopping (e.g., information regarding products).

When contents of the second server 206 are free of charge, since anyone can access the second server 206 in order to use or purchase contents, it is not as necessary to ensure the security of the remote user interface session that is started in operation 210 compared to the case where contents have to be purchased. However, when the contents of the second server 206 need to be paid for, since a process in need of security, such as a payment process for purchasing the contents, needs to be performed, it is essential to ensure the security of the session.

In operation 214, the client 204 selects a user interface related to the process in need of security from among the user interfaces received in operation 212. As described above, the process in need of security is a payment process for using or purchasing the contents.

The client 204 selects the user interface related to the process in need of security, based on a user's input. For example, when the client 204 is a TV, a TV viewer selects a payment item for a movie 'A' via a remote controller, etc., or a TV viewer doing online-shopping selects a payment item for clothes 'A' via a remote controller, etc.

In operation 216, the client 204 transmits information to the first server 202, wherein the information includes selection information regarding an item, i.e., the user interface selected by the client 204 in operation 214 and information regarding an execution environment of the client 204 for the process in need of security.

In the present exemplary embodiment, the client 204 communicates directly with the second server 206 to perform the process in need of security in order to prevent security from deteriorating while performing the process, such as a payment process for purchasing contents. In order to achieve this, the client 204 transmits information to the first server 202. The transmitted information is related to an execution environment of a process that can be performed by the client 204 itself. At least one piece of information from among information regarding the execution environment and security mechanism of an application that can be performed by the client 204 is transmitted to the first server 202 as the information regarding the execution environment.

The information regarding the execution environment may be transmitted using an additional action, as illustrated in FIG. 2. In other words, the information regarding the execution environment may be transmitted to the first server 202 via an action that is separately generated in the session that is started in operation 210.

As another example, the information regarding the execution environment may be transmitted to the first server 202 by using a device description and/or a service description, which is/are defined in a home network including the first server 202 and the client 204. The information regarding an execution environment of a process performed by the client 204 may be transmitted using a device description and/or a service description, which is/are defined in a discovery operation of a universal plug and play (UPnP) home network.

In operation 216, the first server 202 may perform an authentication process in which it is checked whether the client 204 is reliable or not. After it is checked that the client 204 is an authenticated device that can perform the process in need of security, the first server 202 transmits a predetermined application and/or a uniform resource location (URL) of an application to the client 204 in operation 218.

In operation 218, the first server 202 transmits data related to the process in need of security to the client 204. The first server 202 transmits an application for performing the process and/or a URL used for downloading the application. When the process in need of security is a payment process, the first server 202 transmits an application for payment and/or a URL used for downloading the application for payment to the client 204.

When the first server 202 contains the application, the first server 202 transmits the application itself to the client 204. When the first server 202 contains only a URL used for downloading the application, the first server 202 transmits the URL to the client 204.

In operation 220, the client 204 installs the application received in operation 218. When only the URL of the application is received in operation 218, the client 204 downloads the application according to the URL in order to install the application for performing the process in need of security.

Operations 218 and 220 are required when the client 204 does not contain the application for performing the process in need of security. Operations 218 and 220 are not required when the client 204 already contains the application.

In operation 222, the client 204 communicates directly with the second server 206 to perform the process in need of security. When the process in need of security is a payment process, the client 204 communicates directly with the second server 206 to perform the payment process by using the application for payment, which is installed in operation 220.

The client 204 communicates directly with the second server 206 to perform the process in need of security via an out-of-band communication link in which security is ensured. Since the client 204 directly accesses the second server 206 to perform the process in need of security without passing through the first server 202, security information of the client 204 can be stably transmitted to the second server 206.

In operation 224, the client 204 transmits the result of performing the process in need of security to the first server 202. In the case of a payment process, the client 204 communicates directly with the second server 206 to perform payment in operation 222, and transmits the result of performing the process to the first server 202.

Although FIG. 2 illustrates the case where the client 204 transmits the result of performing the process to the first server 202, the second server 206 may transmit the result of performing the process to the first server 202.

In operation 226, the first server 202 provides a user interface related to the result of performing the process, which is received in operation 224, to the client 204. The user interface provided to the client 204 is updated according to the result of performing the process.

In operation 228, the first server 202 and the client 204 continue to perform the session that is started in operation 210.

Figure 3:
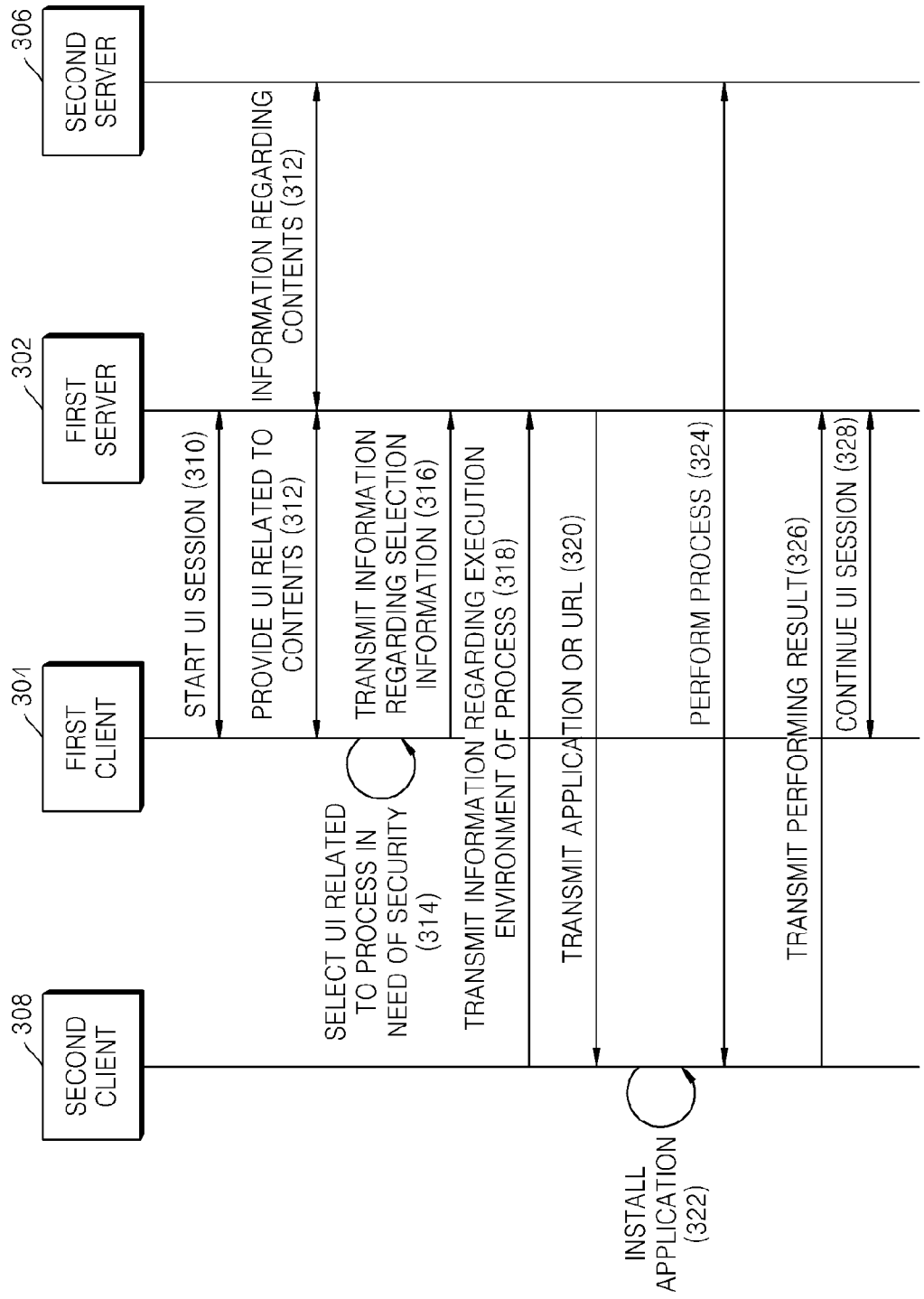
FIG. 3 is a flowchart of a method of ensuring security of a session, according to another exemplary embodiment of the present invention.

FIG. 3 is a flowchart of a method of ensuring security of a session, according to another exemplary embodiment of the present invention.

Referring to FIG. 3, a first server 302 is a device that defines a session by providing a user interface to a first client 304. The first client 304 is a device that receives the user interface from the first server 302 and uses contents of a second server 306 by using the user interface received from the first server 302. The second server 306 is a server operated by a contents provider and contains the contents provided to the first client 304. A second client 308 is a separate device for performing a process in need of security.

The first server 302, the first client 304 and the second client 308 may exist in the same home network. The first server 302 may be an RUIS of the home network. Correspondingly, the first client 304 may be an RUIC of the home network.

When the first server 302, the second server 306 and the first client 304 are devices of an IPTV network, the first server 302 may be an IPTV set top box relaying IPTV contents to the client 304, the client 204 may be a TV that displays the IPTV contents, and the second server 306 may be a contents server operated by an IPTV service provider. The second client 308 may be a mobile device (e.g., a cellular phone) used for performing the process in need of security, such as a payment process.

The present exemplary embodiment is different from the method of FIG. 2 in that the second client 308, that is a separate device performs the process in need of security instead of the first client 304, that is a user interface client. Hereinafter, with reference to FIG. 3, the present exemplary embodiment will be described in more detail.

In operation 310, the first server 302 and the first client 304 start a predetermined remote user interface session.

In operation 312, the first server 302 receives information regarding predetermined contents from the second server 306, and provides user interfaces related to the contents to the first client 304, based on the received information.

In operation 314, the first client 304 selects a user interface related to the process in need of security from among the user interfaces received in operation 312. As described above, the process in need of security is a payment process for using or purchasing the contents.

In operation 316, the first client 304 transmits selection information regarding an item, i.e., the user interface selected in operation 314 to the first server 302.

In operation 318, the second client 308 transmits information regarding an execution environment of the second client 308 for the process in need of security to the first server 302. When the first client 304 that is a user interface client cannot directly perform the process in need of security which is selected in operation 314, the first server 302 searches for devices that can perform the process in a home network, and receives information regarding the execution environment of the process from the second client 308 that is searched.

Information regarding the execution environment and/or security mechanism of application that can be performed by the second client 308 is transmitted to the first server 302 as the information regarding the execution environment.

The information regarding the execution environment may be transmitted to the first server 302 by using an additional action, as illustrated in FIG. 3. However, the information regarding the execution environment may be transmitted to the first server 302 by using a device description and/or a service description, which is/are defined in a home network including the first server 302 and the first client 304. For example, the information regarding the execution environment may be transmitted to the first server 302 by using a device description and/or a service description, which is/are defined in a discovery operation of a UPnP home network.

In operation 320, the first server 302 transmits data related to the process in need of security to the second client 308. The first server 302 transmits an application for payment and/or a URL used for downloading the application for payment to the second client 308.

In operation 322, the second client 308 installs the application received in operation 320. When only the URL of the application is received in operation 320, the application is downloaded in order to be installed from a resource corresponding to the URL.

Operations 320 and 322 are required when the second client 308 does not contain the application for performing the process in need of security. Operations 320 and 322 are not required when the second client 308 already contains the application.

In operation 324, the second client 308 communicates directly with the second server 306 to perform the process in need of security. The second client 308 directly accesses the second server 306 to perform the process in need of security via an out-of-band communication link.

In operation 326, the second client 308 transmits the result of performing the process in need of security to the first server 302. As described with reference to FIG. 2, although in the present case the second client 308 transmits the result of performing the process to the first server 302, the second server 306 may transmit the result of performing the process to the first server 302.

In operation 328, the first server 302 and the first client 304 continue to perform the session that is started in operation 310. The first server 302 provides a user interface related to the result of performing the process, which is performed in operation 324, to the first client 304. The user interface provided to the first client 304 is updated according to the result of performing the process.

Figure 4:
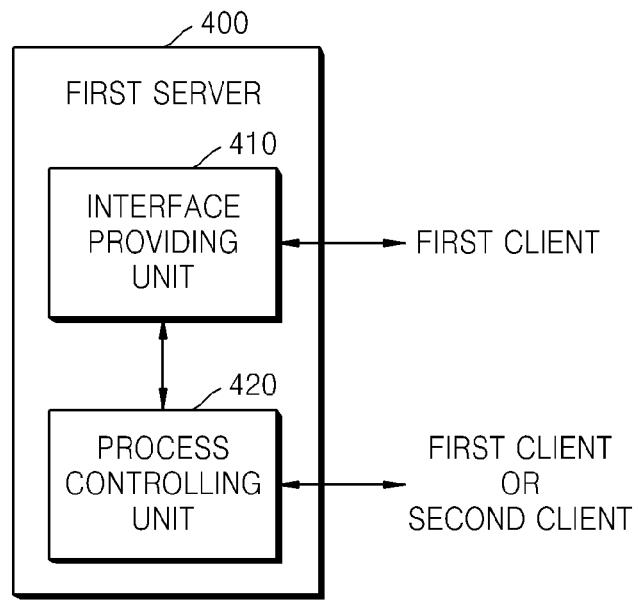
FIG. 4 is a block diagram of a remote user interface server (RUIS), according to an exemplary embodiment of the present invention.

FIG. 4 is a block diagram of a first server 400, according to an exemplary embodiment of the present invention.

The first server 400 corresponds to the first server 202 illustrated in FIG. 2 or the first server 302 illustrated in FIG. 3, and may be an RUIS. In the case of an IPTV network, the first server 400 may be an IPTV set top box relaying IPTV contents to devices of a home network.

Referring to FIG. 4, the first server 400 includes an interface providing unit 410 and a process controlling unit 420.

The interface providing unit 410 provides user interfaces related to predetermined contents to an RUIC. The interface providing unit 410 receives information regarding contents contained in a server operated by a contents provider and provides user interfaces related to the contents to a first client 500 (see FIG. 5). The first client 500 is a device of a home network to which the user interface is provided, and may be an RUIC.

When the first client 500 receiving the user interfaces of the first server 400 selects a user interface related to a process in need of security, the first client 500 calls the process controlling unit 420 in order to perform the process.

The process controlling unit 420 transmits data related to the process to the first client 500 that is an RUIC or a second client 600 (see FIG. 6) that is a separate client for performing the process in need of security. The process controlling unit 420 receives information regarding an execution environment of the process in need of security from the first client 500 and/or the second client 600, and then transmits an application for performing the process in need of security and/or a URL used for downloading the application to the first client 500 or the second client 600, based on the received information. The information regarding the execution environment of the process may include an execution environment of the application, a security mechanism of the application for performing the process, etc. The information regarding the execution environment may be received using an additional action, or alternatively may be received using a device description and/or a service description, which is/are defined in a discovery operation of a home network.

In addition, the process controlling unit 420 receives the result of performing the process in need of security, which is performed by the first client 500 or the second client 600. The process controlling unit 420 receives the result of performing the process that is performed using a method in which the first client 500 or the second client 600 communicates directly with the server operated by the contents provider via an out-of-band communication link.

The interface providing unit 410 updates the user interface provided to the first client 500 according to the result of performing the process, which is received by the process controlling unit 420. In other words, the interface providing unit 410 provides a user interface related to the result of performing the process to the first client 500.

Figure 5:
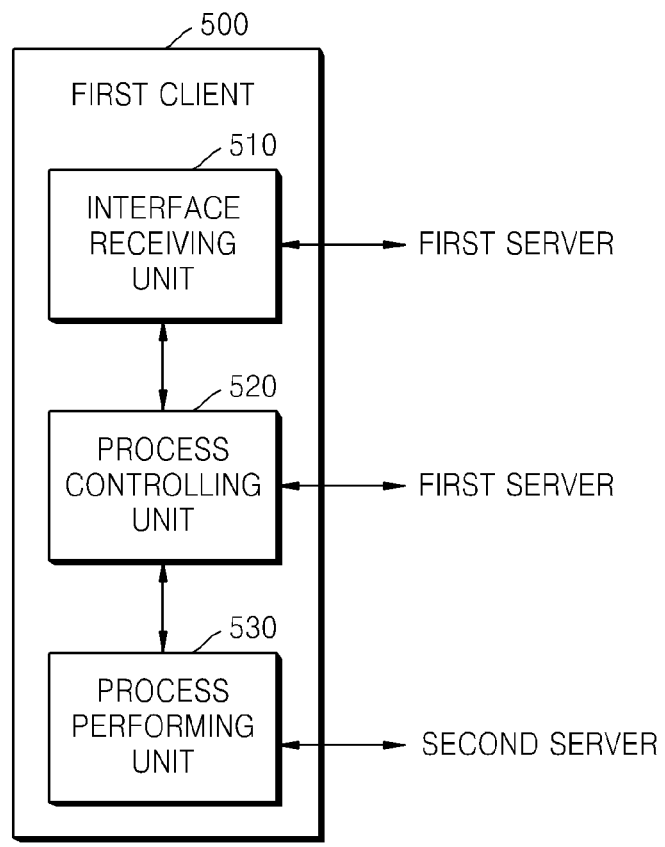
FIG. 5 is a block diagram of a remote user interface client (RUIC), according to an exemplary embodiment of the present invention.

FIG. 5 is a block diagram of a first client 500, according to an exemplary embodiment of the present invention.

The first client 500 corresponds to the client 204 illustrated in FIG. 2 or the first client 304 illustrated in FIG. 3, and may be an RUIC. In the case of an IPTV network, the first client 500 (see FIG. 5) may be a TV that displays IPTV contents.

Referring to FIG. 5, the first client 500 includes an interface receiving unit 510, a process controlling unit 520 and a process performing unit 530. In FIG. 5, the first client 500 is illustrated as performing a process in need of security. The case in which the second client 600, which is a separate device, performs the process in need of security, will be described with reference to FIG. 6.

The interface receiving unit 510 receives user interfaces related to predetermined contents from the first server 400 that is a user interface server. In addition, the interface receiving unit 510 selects a user interface related to the process in need of security from among the user interfaces received from the first server 400, based on a user's input.

When the interface receiving unit 510 selects the user interface related to the process in need of security, the process controlling unit 520 transmits information regarding an execution environment of the process in need of security to the first server 400, and receives an application for performing the process in need of security and/or a URL used for downloading the application from the first server 400 so as to install the application.

The process performing unit 530 performs the application installed by the process controlling unit 520 in order to communicate directly with a second server. The process performing unit 530 communicates directly with the second sever via an out-of-band communication link in order to perform the process in need of security.

When the process is completed, the process controlling unit 520 transmits the result of performing the process to the first server 400, and receives a user interface related to the result transmitted by the first server 400, based on the result of performing the process.

Figure 6:
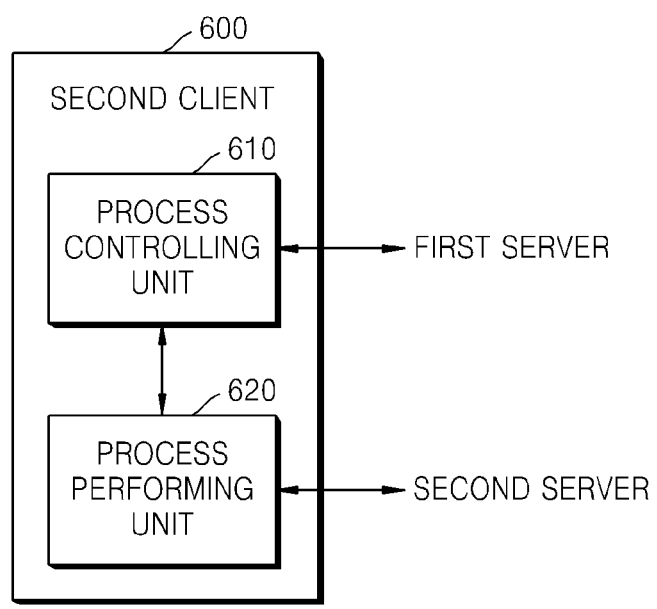
FIG. 6 is a block diagram of a separate client for performing a process in need of security, according to an exemplary embodiment of the present invention.

FIG. 6 is a block diagram of a second client 600, according to an exemplary embodiment of the present invention.

The second client 600 corresponds to the second client 308 illustrated in FIG. 3, and is a separate device for performing a process in need of security. The second client is a device of a home network, like the first server 400, and may be a mobile device such as a cellular phone for performing the process in need of security, such as a payment process.

Referring to FIG. 6, the second client 600 includes a process controlling unit 610 and a process performing unit 620. In FIG. 6, the second client 600 is illustrated as performing the process in need of security instead of the first client 500.

The process controlling unit 610 transmits information regarding an execution environment of the process (i.e., information regarding an execution environment and a security mechanism of an application for performing the process) to the first server 400 (see FIG. 4), and receives the application and/or a URL used for downloading the application from the first server 400.

The process performing unit 620 executes the application received from the process controlling unit 610 so as to perform the process in need of security. By executing the application, the process performing unit 620 communicates directly with a second server of a contents provider so as to perform the process in need of security.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. An exemplary embodiment can also be directed to carrier waves (such as data transmission through the Internet). The computer readable recording medium can also be distributed over network coupled computer systems so that the computer readable code is stored and executed in a distributed fashion.

According to the above exemplary embodiments of the present invention, security information of a client can be directly transmitted to a server operated by a contents provider via an out-of-band in a session defined using a RUI, thereby safely protecting the security information of the client.

In addition, when a client cannot perform a process in need of security, an additional third client performing the process is used, thereby providing a scalable security solution.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of ensuring security of a session of a first server with respect to a first client, the method comprising:
   providing, by the first server, user interfaces related to predetermined contents to the first client;
   transmitting, by the first server, data related to a process in need of security to a second client while the first client selects a user interface related to the process from among the user interfaces; and
   receiving, by the first server, a result of performing the process from the second client by using the transmitted data,
   wherein the second client communicates directly with a second server providing the predetermined contents to perform the process, and
   wherein the second client is searched for by the first server in response to the first client selecting the user interface related to the process, the first server receives information from the second client in response to the search, based on which at least one of an application for performing the process and a uniform resource location (URL) address used to download the application for performing the process is transmitted by the first server to the second client, and the second client installs the application to perform the process.

2. The method of claim 1, wherein the first server is a remote user interface server (RUIS) and the first client is a remote user interface client (RUIC).

3. The method of claim 2, wherein the first server, the first client and the second client are devices of a home network.

4. The method of claim 3, wherein the transmitting of the data comprises:
   receiving information regarding at least one of an execution environment and a security mechanism of the application for performing the process from at least one of the first client and the second client; and
   transmitting at least one of the application for performing the process and the uniform resource location (URL) address used to download the application for performing the process to the first client or the second client, based on the received information.

5. The method of claim 4, wherein the receiving of the information regarding at least one of the execution environment and the security mechanism of the application comprises receiving information regarding at least one of the execution environment and the security mechanism of the application for performing the process from at least one of the first client and the second client by using at least one of a device description and a service description that are defined in the home network.

6. The method of claim 3, wherein the first server is an Internet protocol television (IPTV) set top box, and the first client is a TV.

7. The method of claim 1, wherein the process is related to payment for the predetermined contents.

8. The method of claim 1, wherein the first server receives information regarding a security mechanism of the application for performing the process from the second client in response to the search.

9. A method of ensuring security of a session of a first client with respect to a first server, the method comprising:
   receiving, by the first client, user interfaces related to predetermined contents from the first server;
   selecting, by the first client, a user interface related to a process in need of security from among the user interfaces; and
   receiving, by the first client, a user interface related to a result of performing the process from the first server, according to the selection,
   wherein a second client communicates directly with a second server providing the predetermined contents to perform the process, and transmits the result of performing the process to the first server, and
   wherein the second client is searched for by the first server in response to the first client selecting the user interface related to the process, the first server receives information from the second client in response to the search, based on which at least one of an application for performing the process and a uniform resource location (URL) address used to download the application for performing the process is transmitted by the first server to the second client, and the second client installs the application to perform the process.

10. The method of claim 9, wherein the first server is an RUIS, and the first client is an RUIC.

11. The method of claim 10, wherein the first server, the first client and the second client are devices of a home network.

12. The method of claim 11, wherein the receiving of the user interface related to the result of performing the process comprises:
   receiving at least one of the application for performing the process and the URL used to download the application for performing the process from the first server;
   installing the application for performing the process, based on the received application or the URL;
   executing the installed application to perform the process;
   transmitting a result of performing the process to the first server; and
   receiving a user interface related to the result from the first server.

13. The method of claim 12, wherein the receiving of at least one of the application for performing the process and the URL used to download the application for performing the process comprises:
   transmitting information regarding at least one of an execution environment and a security mechanism of the application for performing the process of the first client to the first server; and
   receiving at least one of the application for performing the process and the URL used to download the application for performing the process, which are transmitted by the first server, according to the transmitted information.

14. The method of claim 13, wherein the transmitting of the information regarding at least one of the execution environment and the security mechanism of the application of the first client comprises transmitting information regarding at least one of the execution environment and the security mechanism of the application for performing the process of the first client by using at least one of a device description and a service description that are defined in the home network.

15. The method of claim 11, wherein the second client receives at least one of an application for performing the process and a URL used to download the application for performing the process from the first server, installs and executes the application for performing the process, based on the received application or the URL to perform the process, and then transmits a result of performing the process to the first server.

16. The method of claim 9, wherein the first server is an Internet protocol television (IPTV) set top box, and the first client is a TV.

17. The method of claim 9, wherein the process is related to payment for the predetermined contents.

18. An apparatus operating as a first server for ensuring security of a session of the first server with respect to a first client, the apparatus comprising:
   an interface providing unit comprising circuitry which provides user interfaces related to predetermined contents to the first client; and
   a process controlling unit comprising circuitry which transmits data related to a process in need of security to a second client as the first client selects a user interface related to the process in need of security from among the user interfaces, and receives a result of performing the process by using the transmitted data from the second client,
   wherein the second client communicates directly with a second server to perform the process, and
   wherein if the data related to the process is transmitted to the second client, the second client is searched for by the first server in response to the first client selecting the user interface related to the process, the first server receives information from the second client in response to the search, based on which at least one of an application for performing the process and a uniform resource location (URL) address used to download the application for performing the process is transmitted by the process controlling unit to the second client.

19. The apparatus of claim 18, wherein the first server is an RUIS, and the first client is an RUIC.

20. The apparatus of claim 19, wherein the first server, the first client and the second client are devices of a home network.

21. The apparatus of claim 20, wherein the process controlling unit receives information regarding at least one of an execution environment and a security mechanism of an application for performing the process from at least one of the first client and the second client, and transmits at least one of the application for performing the process and the URL used to download the application for performing the process to the first client or the second client, based on the received information.

22. The apparatus of claim 21, wherein the process controlling unit receives information regarding at least one of the execution environment and the security mechanism of the application for performing the process from at least one of the first client and the second client by using at least one of a device description and a service description that are defined in the home network.

23. The apparatus of claim 18, wherein the process is related to payment for the predetermined contents.

24. An apparatus of a second client for ensuring security of a session between a first server and a first client, the apparatus comprising:
   a process controlling unit comprising circuitry which receives data related to a process in need of security while the first client receives user interfaces related to predetermined contents from the first server and selects a user interface related to the process from among the received user interfaces, the second client being searched for by the first server in response to the first client selecting the user interface related to the process, the second client transmitting information to the first server in response to the search, based on which at least one of an application for performing the process and a uniform resource locator (URL) address used to download the application for performing the process is received from the first server, and the second client installing the application to perform the process; and
   a processing performing unit comprising circuitry which communicates directly with a second server providing the predetermined contents to perform the process, based on the received data,
   wherein the process controlling unit transmits the result of performing the process to the first server.

25. A non-transitory computer readable recording medium having recorded thereon a program for executing a method of ensuring security of a session of a first server with respect to a first client, the method comprising:
   providing, by the first server, user interfaces related to predetermined contents to the first client;
   transmitting, by the first server, data related to a process in need of security to the first client or a second client while the first client selects a user interface related to the process from among the user interfaces; and
   receiving, by the first server, a result of performing the process from the first client or the second client by using the transmitted data, wherein the first client or the second client communicates directly with a second server providing the predetermined contents to perform the process, and wherein if the data related to the process is transmitted to the second client, the second client is searched for by the first server in response to the first client selecting the user interface related to the process, the first server receives information from the second client in response to the search, based on which at least one of an application for performing the process and a uniform resource location (URL) address used to download the application for performing the process is transmitted by the first server to the second client, and the second client installs the application.

26. A non-transitory computer readable recording medium having recorded thereon a program for executing a method of ensuring security of a session of a first client with respect to a first server, the method comprising:

receiving, by the first client, user interfaces related to predetermined contents from the first server;

selecting, by the first client, a user interface related to a process in need of security from among the user interfaces; and receiving, by the first client, a user interface related to a result of performing the process from the first server, according to the selection, wherein the first client or a second client communicates directly with a second server providing the predetermined contents to perform the process, and transmits the result of performing the process to the first server, and if the second client communicates directly with the second server, the second client is searched for by the first server in response to the first client selecting the user interface related to the process, the first server receives information from the second client in response to the search, based on which at least one of an application for performing the process and a uniform resource location (URL) address used to download the application for performing the process is transmitted by the first server to the second client, and the second client installs the application.

* * * * *